Jan. 26, 1932.  M. SCHLEICHER  1,842,769
DEVICE FOR REGULATING OPERATING QUANTITIES
Filed April 25, 1930  2 Sheets-Sheet 1
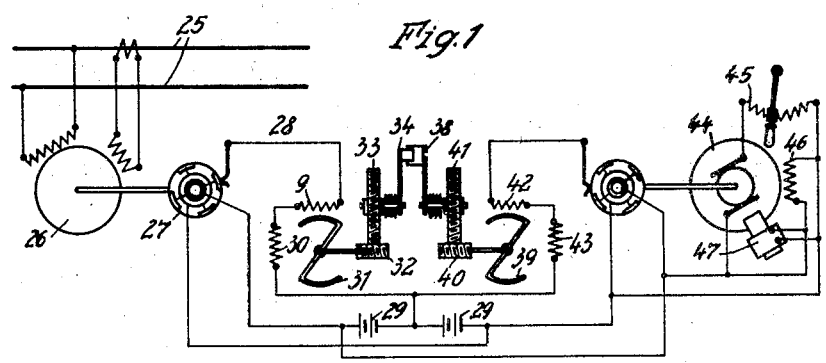
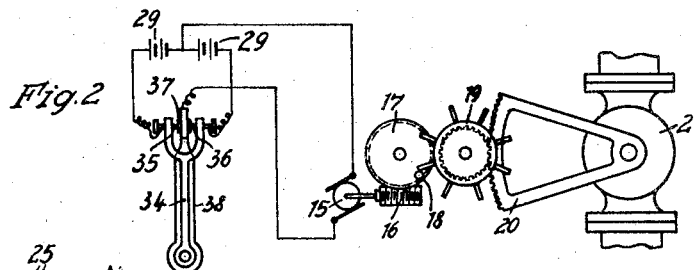
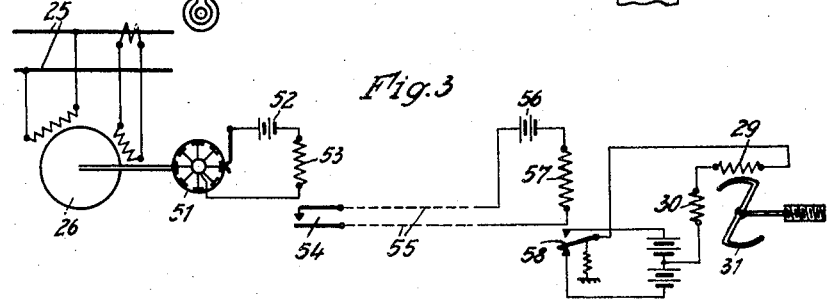
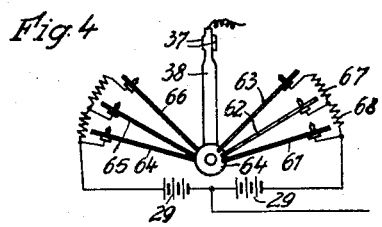
Inventor:
Manfred Schleicher
by Lotka & Kehlenbeck
Attorneys Jan. 26, 1932.  M. SCHLEICHER  1,842,769
DEVICE FOR REGULATING OPERATING QUANTITIES
Filed April 25, 1930   2 Sheets-Sheet 2

Inventor:
Manfred Schleicher
by
Lorra & Kellenbeck
Attorneys

Patented Jan. 26, 1932

1,842,769

UNITED STATES PATENT OFFICE

MANFRED SCHLEICHER, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

DEVICE FOR REGULATING OPERATING QUANTITIES

Application filed April 25, 1930, Serial No. 447,401, and in Germany April 27, 1929.

My invention relates to a device for regulating operating quantities in such a manner that the speed of a movable member, hereafter called the intermediate member, depends upon the magnitude of the operating quantity at that particular instant, and that the regulating movement is obtained from the difference between the speed of the intermediate member and that of a second member, hereafter called the reference member. Devices of that kind are known.

According to the invention, the intermediate member is driven step-by-step by a succession of impulses, the frequency of which is influenced by the magnitude of the operating quantity at that particular instant. The impulses may be of any kind whatever, for instance, electrical or mechanical. They have the advantage that even long distances or external influences on the lines cannot diminish the reliability of regulation, for, as each impulse produces a step-movement, the amount of regulation depends only on the number of impulses and not on the strength with which they are given. Whilst the intensity of energy when being transmitted, is liable to alter, the number of impulses will always remain substantially the same.

Figure 5:
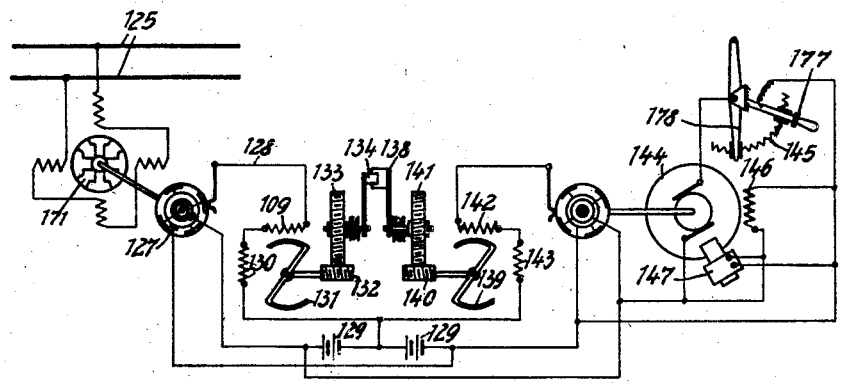
Figure 6:
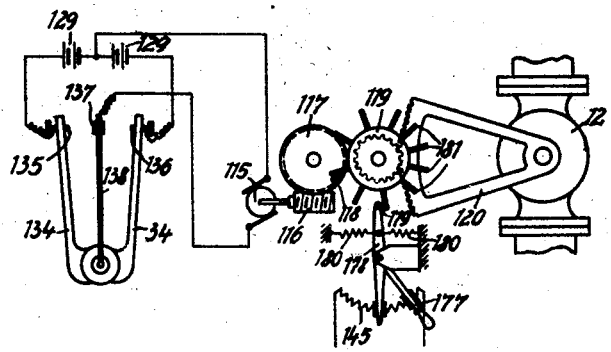

Reference is to be had to the accompanying drawings, in which Fig. 1 shows diagrammatically a portion of an arrangement embodying my invention; Fig. 2 shows, on a larger scale, the contact device of Fig. 1 together with the controlling circuit and associated parts; Fig. 3 is a modification of a portion of Fig. 1; Fig. 4 illustrates a modification in which yielding contacts are combined with a sectional resistance; and Figs. 5 and 6 are views corresponding substantially to Figs. 1 and 2 respectively, but illustrating another embodiment of my invention.

Fig. 1 shows, as an example, a device suitable for applying the method according to the invention. By means of this device, the energy in an alternating current line 25 is to be kept constant by adjusting a valve 2 (Fig. 2) for the prime mover of a generator feeding the line. The adjustment of this steam valve, when the output, which is to be kept constant, increases or decreases, is the object to be attained with the means according to the invention.

The watt-hour meter 26 runs at a speed corresponding to the energy in the line 25 and drives a commutator 27, which sends alternately positive and negative current impulses from the source of current 29 into the conductor 28. These current impulses excite two coils 9 and 30, which are mounted with their axes at right angles to one another. In the field produced by these coils a Z-type armature 31, such as those used in the movements of secondary clocks, is mounted to rotate. At each current impulse, the Z-type armature turns one quarter of a revolution, the direction of rotation always remaining the same. A worm 32 secured to the armature shaft rotates in unison therewith and meshes with the worm wheel 33 to drive the intermediate member 34. The intermediate member consists of an arm, the end of which is forked, as shown in the side view, Fig. 2, and provided with two contact screws 35 and 36. The latter are connected with the positive and negative poles respectively of the source of current 29. Between the contacts 35 and 36 there is a contact 37, passing to another rotating arm 38. This latter arm is called the reference member and in the example under consideration it is also driven by a Z-type armature 39 through the worm 40 and the worm wheel 41. The Z-type armature 39 turns step by step in the field of the coils 42 and 43 mounted with their axes at right angles to one another. As the energy in the line 25 is to be regulated so as to be constant, the reference member 38 must also have a constant speed, the Z-type armature 39 must therefore be moved by current impulses of constant frequency.

For this purpose the disk of a direct-current meter 44 is driven from a source of current 29 through a rheostat 45; the exciting coil is indicated by 46. The eddy-current brake 47 is not, as usually, a permanent magnet but an electro-magnet, the excitation of which depends upon the voltage of the source of current 29. When the voltage of the source of current drops, the counter torque decreases and the disk of the meter assumes a higher speed. The fall in speed, which would result from the drop in voltage at the armature is hereby compensated. In any case it is by this means possible to maintain within certain limits a constant speed of the meter disk 44, even if the driving voltage does not remain quite constant.

By means of the two Z-type armatures 31 and 39, the intermediate member 34 and the reference member 38 are driven step by step. The play of the contact 37 between the contacts 35 and 36 may be adjusted by turning the contact screws to influence the sensitiveness of the regulation. The play must in any case be large enough to avoid a contact being closed owing to the Z-type armatures not making the steps simultaneously. As long as the mean speeds of the intermediate member 34 and of the reference member 38 obtained through the above steps remain the same, no contact is to close. It is only, when the energy in 25 becomes, for instance, too large that the steps of the Z-type armature 31 become too frequent and the mean speed of the intermediate member 34 increases, so that its contact 35 catches up the contact 37 of the reference member 38.

The motor 15 is thereby cut into circuit and drives, through the worm 16, the worm wheel 17. The latter wheel is provided with a pin 18, which at each revolution acts on an arm of a regulating wheel 19 to turn said wheel the distance of from one arm to the next. The toothed rim on wheel 19 engages with the toothed segment 20 by which the valve 2 is closed in a corresponding degree. If, on the contrary, the energy in 25 is too small, then the contact 37 of reference member catches up with the contact 36 of the intermediate member, the current sent into the motor 25 is in the opposite direction and the motor opens the steam valve 2 wider. In order to be able to regulate the energy of the alternating current in the line 25 to different values, the mean speed of the reference member 38 is made adjustable. For this purpose the rheostat 45 is provided, which permits of the constant speed of the meter disk 44 being adjusted.

In Fig. 3, I have illustrated a construction in which the coils 29, 30 (which are arranged in the same relation to the armature 31 as the coils 9, 30 of Fig. 1), are not directly in the circuit of the electric impulse-producer, but are actuated by means of a relay. The impulse-producer 51 has the same function as the part 27 of Fig. 1, in relation to the meter 26, but sends its impulses through a magnet coil 53, the armature 54 of which will alternately open and close an electric circuit 55 containing a source of electricity 56 and a relay coil or magnet 57. The spring-controlled armature 58 of this relay will thus send the current from a local battery or other source of electricity through the coils 29, 30 alternately in opposite directions, the connections being properly made to obtain this result. Thus, even though a direct current proceeds from the battery or other source, such current will, by the oscillations of the armature 58, be transformed virtually into an alternating current, so far as the meter or motor 29, 30, 31 is concerned.

Fig. 4 shows a construction of the intermediate member, which in many cases ensures a still better regulation. With this arrangement, the intermediate member consists of six elastically mounted contact holders, the contact holders 61, 62, 63 being mounted on a nave 64, while the three contact holders 64, 65, 66 are mounted on another nave behind 64 and not visible in the figure. The two naves are normally connected rigidly, but may be turned with respect to one another about their axis so that the play for the contact 37 of the reference member 38 can be varied.

When in operation, the two naves with the elastically mounted contact holders are rigidly fixed to one another. If the reference member catches up to the intermediate member, it comes at first in contact with the contact of the contact holder 63. The circuit of the source of current 29 is closed but the resistors 67 and 68 are still in circuit. The regulating motor 15 therefore only runs slowly. If the resulting displacement of the steam valve 2 is not sufficient and the speed of the reference member 38 is still higher than that of the intermediate member, the elastic contact holder 63 is bent back until its contact also touches the contact of the contact holder 62. The resistor 67 is thereby short-circuited and the speed of the motor is increased. If this is still not sufficient, the resistor 68 is short-circuited owing to the contact holder 62 being bent back so that the speed of the motor 15 is again increased. It is naturally also possible to make the intermediate member inelastic and the reference member elastic; or both members may be provided with elastic contacts.

In contrast to the known regulating devices, in which the power or other quantity to be regulated is measured by means of a chopper-bar instrument and in which the chopper-bar causes the pointer to make contact intermittently, the invention has the advantage that the varying power has an influence on the regulation during the whole course of its duration. In a prior device of the character just referred to, any power variations which happen to occur only in the intervals between two movements of the chopper bar, are not taken into account at all in the regulation. In addition to the above, the invention enables the equipment to be constructed in a very inexpensive manner, owing to the fact, that nearly all the component parts have for a long time past been manufactured in quantity production, particularly the meters, the change-over switches and Z-type armatures, which are used for the movements of secondary clocks. Another advantage in the construction is that between the contact-pieces 35, 36 and 37 a good contact can always be obtained with certainty because the spaces between the contacts do not alter gradually, but in step or jerks, taking place each time over a distance corresponding to a step of the Z-type armature. The contacts may be readily so set with respect to one another that either no contact at all is made or that with each consecutive full step of a Z-type armature a sure contact is made. A sufficient power for pressing the contacts together is obtained through the worm gearing employed.

In order to avoid any overregulation, the precautionary measure taken with other methods of regulation may also be applied, for instance, the regulating current may be made to be interrupted after some time by a member sensitive to heat. Over-regulating can also be avoided by altering momentarily at each regulating movement, and simultaneously with this movement, the speed of the one or the other of the two members of the intermediate member or the reference member, in such a manner that the two members, which had come into contact and caused the regulating movement, are parted. An example of this kind is shown in Figs. 5 and 6. As an example a device is chosen, in which the frequency of an alternating current line 125 is to be maintained at a certain value, by adjustment of the valve 12 (Fig. 6) for the prime mover of an additional generator.

A synchronous motor 171 runs at a speed corresponding to the frequency in the line 125 and drives a commutator 127 which sends alternately positive and negative current impulses from the source of current 129 into the conductor 128. These current impulses excite two coils 109 and 130, mounted with their axes at right angles to one another. In the field produced by these coils a Z-type armature 130 is pivoted so as to rotate in the manner described in connection with Fig. 1. At each current impulse the Z-type armature turns a quarter of a revolution, the direction of rotation always remaining the same. The Z-type armature drives, through the worm 132 and worm-wheel 133, the intermediate member 134. This member is shown, on a larger scale and seen in the direction of the axis, in Fig. 6. It consists of a forked arm, provided with two contact screws 135 and 136. The latter are connected to the positive and negative poles respectively of the source of current 129. A contact 137, fastened to a rotating arm 138, plays between the contacts 135 and 136. This arm which is here called the reference member is driven by a Z-type armature 139 through the worm 140 and the worm wheel 141 (Fig. 5). This Z-type armature moves step by step in the field of the crosswise mounted coils 142 and 143. To produce the current impulses for these coils a direct-current meter 144 is used which is driven from the source of current 129 through a rheostat 145; the usual coils of the meter are indicated by 146.

The eddy-current brake 147 is not, as usually, a permanent magnet, but an electromagnet, the excitation of which depends on the voltage of the source of current 129, in order that the loss of speed caused, if the voltage of the source of current drops, should as much as possible be compensated. The rheostat 145 may be adjusted both my hand using a contact lever 177 and by means of a controlled lever 178. By means of the two Z-type armatures 131 and 139, the intermediate member 134 and the reference member 138 are driven step by step. The play of the contact 137 between the two contacts opposite to it may be adjusted by turning the screws 135 and 136, to influence the sensitiveness of the regulation. The play must in any case be large enough to avoid a contact being closed owing to the step movements of the Z-type armatures not being performed simultaneously. As long as the mean speeds of the intermediate member 134 and the reference member 138, obtained through the above steps remain the same, no contact is to close. If, however, the frequency in 125 becomes, for instance, too high, than the steps made by the Z-type armature 130 are too frequent, the mean speed of the intermediate member 134 increases, so that its contact 135 catches up to the contact 137 of the reference member 138. The motor 115 (Fig. 6) is thereby cut into circuit and drives, through the worm 116, the worm wheel 117. The latter wheel is provided with a pin 118 which with each revolution it makes pushes the regulating wheel 119 round a distance of from one of its regulating spokes 181 to the next. The toothed rim on wheel 119 engages with the toothed segment 120, by which the valve 12 is closed in a corresponding degree. In the path of the regulating spokes 181 of the regulating wheel 119 is also situated the pin 179 on the double-armed lever 178 which is thus actuated by said spokes and slides on the rheostat 145 (Fig. 5). Through the movement of the contact lever 178, produced by the regulating wheel 119, the resistance of the rheostat 145 is diminished and the speed of the meter 144, therefore, increased. Consequently the steps of the Z-type armature 139 are momentarily accelerated and thereby the mean speed of the reference member 138 is increased so that the contact between both members is opened. After the regulating wheel 119 has completed its step, the contact lever 178 is pulled back by the springs 180 into its middle position so that the meter 144 and therefore also the reference member 138 resume their normal speed. If, on the contrary, the frequency in 125 is too low, the contact 137 of the reference member will catch up with the contact 136 of the intermediate member, the current flows through the motor 115 in the opposite direction and the steam valve 12 is opened wider. At the same time the contact lever 178 is also turned for a moment but this time in the contrary direction so that the speed of the meter 144 and that of the reference member 138 is for a moment decreased in order to separate the contacts 136 and 137. Often the sensitiveness of regulation varies according to whether the regulating organ—in the described example, therefore, the steam valve 12—is near its closing position or near the position in which it is fully open.

In order to be able to obtain a positive and quick regulation, it is desirable that each regulating step should have the same influence, not depending upon whether the machine is working near no-load or near full load. This can be achieved by making the size of the regulating steps dependent on the position of the regulating organ. In Fig. 6 the regulating spokes 181 of the regulating wheel 119 are for this reason arranged at different distances, the one from the other. Where there is a large interval, the regulating step is correspondingly longer, and where the interval is small, the step is correspondingly shorter.

While I have referred to a specific instance in which my improved regulating mechanism operates to govern a steam valve, 2 or 12, controlling the supply of steam to the engine which drives the generator of alternating current for the mains 25 or 125. I desire it to be understood that the invention may be utilized in various other ways. For instance, in cases where a supply of fuel and air is required (as, to a steam boiler furnace, or to the combustion chamber of a gas engine), the standard speed of the shaft of the meter 44 or 144 may be made dependent on the fuel supply, while the controlling circuit associated with the contacts 35, 36, 37, or 135, 136, 137 regulates the supply of air. Obviously, the circuit closed by the engagement of the said contacts could be utilized for various functions other than those above referred to.

I claim as my invention:

1. As a means for insuring the positive and firm engagement of two contacts in devices in which an electric circuit is to be altered in the event of a departure from normal conditions, a movable member, means for driving said member at a standard speed, another movable member and means for driving it at a speed depending on variations of a predetermined factor, said last-mentioned driving means imparting to the respective movable member an intermittent motion, by a succession of jerks, contacts adapted to come into and out of engagement with each other and to be moved relatively to each other by said jerky motion when the speed of said second-mentioned member deviates from a predetermined normal rate sufficiently to cause a relative motion of the two movable members greater than one of the jerks of said intermittent motion, and an electric circuit associated with said contacts.

2. A device according to claim 1, in which the contacts comprise a pair of spaced contacts and an intermediate contact arranged between them and adapted to engage either of them.

3. A device according to claim 1, in which the contacts are adjustable relatively to each other.

4. The combination with a shaft and means for driving it at a standard speed, of another shaft, separate means for driving said second shaft at a speed varying under certain conditions, one of said driving means comprising an electric motor having a Z-type armature and two field coils disposed at an angle to each other and adapted for operation by an alternating current, to impart to the respective shaft an intermittent motion by a succession of jerks, contacts connected with the respective shafts and adapted to be brought into engagement with each other by said jerky motion when the speed of said second-mentioned shaft deviates from a predetermined normal rate, and an electric circuit associated with said contacts.

5. The combination with a shaft and means for driving it at a standard speed, of another shaft, separate means for driving said second shaft at a speed varying under certain conditions, one of said driving means comprising an alternating current motor having a Z-type armature and field coils disposed at an angle to each other, and arranged to impart to the respective shaft an intermittent motion by a succession of jerks, a relay armature in circuit with said coils and adapted to direct the current through said coils alternately in opposite directions, means for moving said armature alternately in opposite directions, contacts connected with the respective shafts and adapted to be brought into engagement with each other by said jerky motion when the speed of said second-mentioned shaft deviates from a predetermined normal rate, and an electric circuit associated with said contacts.

6. In a regulating device, a shaft, means for driving such shaft at a standard speed, another shaft, means for driving said second shaft at a speed to be made conformable to the said standard speed, one of said driving means imparting to the respective shaft an intermittent motion by a succession of jerks, two spaced contacts connected with one of said shafts, a contact connected with the other shaft and arranged between said spaced contacts to engage one or the other of them as the speed of the second-mentioned shaft is above or below normal respectively, the gap between such intermediate contact and each of the spaced contacts being greater than the extent of the individual jerks of said intermittent motion, to prevent engagement of said contacts as long as the speed of said second-mentioned shaft remains normal, and an electric controlling circuit associated with said contacts and including means tending to restore the normal speed of said second-mentioned shaft.

7. In a regulating device, a shaft, means for driving such shaft at a standard speed, another shaft, means for driving said second shaft at a speed to be made conformable to the said standard speed, one of said driving means imparting to the respective shaft an intermittent motion by a succession of jerks, contacts connected with the respective shafts and adapted to be brought into engagement with each other by said jerky motion when the speed of said second-mentioned shaft deviates from a predetermined normal rate, and an electric controlling circuit associated with said contacts and including means tending to restore the normal speed of said second-mentioned shaft, said restoring means being constructed to exert a stronger action when the deviation from normal speed is considerable than when such deviation is comparatively slight.

8. In a regulating device, a shaft, means for driving such shaft at a standard speed, another shaft, means for driving said second shaft at a speed to be made conformable to the said standard speed, one of said driving means imparting to the respective shaft an intermittent motion by a succession of jerks, contacts connected with the respective shafts and adapted to be brought into engagement with each other by said jerky motion when the speed of said second-mentioned shaft deviates from a predetermined normal rate, an electric controlling circuit associated with said contacts and including means tending to restore the normal speed of said second-mentioned shaft, and means, associated with the electric controlling circuit, and adapted, upon the engagement of said contacts, to act on one of the shafts to bring said contacts out of engagement.

9. In a regulating device, a shaft, a meter driven electrically at a standard rate, a variable resistance in the circuit of said meter, for adjusting said standard rate, a device, operated by said meter, for producing a series of discontinuous electrical impulses following each other at a standard rate, means for operating said shaft by said standard-rate impulses, another shaft, a second meter responsive to variations of a factor which it is desired to maintain normal, a device operated by said second meter in accordance with variations in the rate at which said meter is running, said device being constructed to produce a series of discontinuous electrical impulses at a rate varying in conformity with the aforesaid variations, means for operating said second-mentioned shaft by said impulses at a speed corresponding to the number of said impulses per unit of time and thereby imparting to said shaft an intermittent motion by a succession of jerks, contacts connected with the respective shafts and adapted to be brought into engagement with each other by said jerky motion when the speed of said second-mentioned shaft deviates from a predetermined normal rate, an electric controlling circuit associated with said contacts and including means tending to restore the normal speed of said second-mentioned shaft, and means for adjusting said variable resistance, said adjusting means being operated automatically upon the closing of the electric controlling circuit.

10. In a regulating device, a shaft, means for driving such shaft at a standard speed, another shaft, means for driving said second shaft at a speed to be made conformable to the said standard speed, one of said driving means imparting to the respective shaft an intermittent motion by a succession of jerks, contacts connected with the respective shafts and adapted to be brought into engagement with each other by said jerky motion when the speed of said second-mentioned shaft deviates from a predetermined normal rate, one of said shafts being connected with a plurality of said contacts and such contacts connected with said shaft being mounted elastically, a variable resistance, portions of which are connected with said contacts to cause an increase in the regulating speed when the elastic mountings of said contacts are bent, and an electric controlling circuit associated with the contacts connected with both shafts and including means tending to restore the normal speed of said second-mentioned shaft.

11. In a regulating device, a shaft, a motor driven electrically at a standard rate, a variable resistance in the circuit of said electric motor, for adjusting said standard rate, a device operated by said motor, for producing a series of discontinuous electrical impulses following each other at a standard rate, means for operating said shaft by said standard-rate impulses, another shaft, a second motor responsive to variations of a factor which it is desired to maintain normal, a device operated by said second motor in accordance with variations in the rate at which said motor is running, said device being constructed to produce a series of discontinuous electrical impulses at a rate varying in conformity with the aforesaid variations, means for operating said second-mentioned shaft by said impulses at a speed corresponding to the number of said impulses per unit of time and thus imparting to said shaft an intermittent motion by a succession of jerks, contacts connected with the respective shafts and adapted to be brought into engagement with each other by said jerky motion when the speed of said second-mentioned shaft deviates from a predetermined normal rate, an electric controlling circuit associated with said contacts and including means tending to restore the normal speed of said second-mentioned shaft, and means whereby at each regulating movement, said resistance will be altered momentarily to suspend the engagement of the said contacts.

12. In a regulating device, a shaft, means for driving such shaft at a standard speed, another shaft, means for driving said second shaft at a speed to be made conformable to the said standard speed, one of said driving means imparting to the respective shaft an intermittent motion by a succession of jerks, contacts connected with the respective shafts and adapted to be brought into engagement with each other by said jerky motion when the speed of said second-mentioned shaft deviates from a predetermined normal rate, an electric controlling circuit associated with said contacts and including means tending to restore the normal speed of said second-mentioned shaft, and means for temporarily suspending the engagement of the contacts at each regulating movement.

13. In a regulating device, a shaft, means for driving each shaft at a standard speed, another shaft, means for driving said second shaft at a speed to be made conformable to the said standard speed, one of said driving means imparting to the respective shaft an intermittent motion by a succession of jerks, contacts connected with the respective shafts and adapted to be brought into engagement with each other by said jerky motion when the speed of said second-mentioned shaft deviates from a predetermined normal rate, an electric controlling circuit associated with said contacts and including means tending to restore the normal speed of said second-mentioned shaft, and means for grading the action of the controlling circuit according to the position of the means tending to restore the normal speed of the second-mentioned shaft.

14. In a regulating device, a shaft, means for driving such shaft at a standard speed, another shaft, means for driving said second shaft at a speed to be made conformable to the said standard speed, one of said driving means imparting to the respective shaft an intermittent motion by a succession of jerks, contacts connected with the respective shafts and adapted to be brought into engagement with each other by said jerky motion when the speed of said second-mentioned shaft deviates from a predetermined normal rate, an electric controlling circuit associated with said contacts and including means tending to restore the normal speed of said second-mentioned shaft, said circuit including a variable resistance, a rotary member having unevenly spaced spokes, means for driving said member, and means operated by said spokes at uneven intervals of time according to the spacing of said spokes, for controlling said variable resistance.

In testimony whereof I affix my signature.

MANFRED SCHLEICHER.